E. D. CULLISON.
FILLER COVER.
APPLICATION FILED FEB. 23, 1918.
1,314,306.
Patented Aug. 26, 1919.
2 SHEETS—SHEET 1.
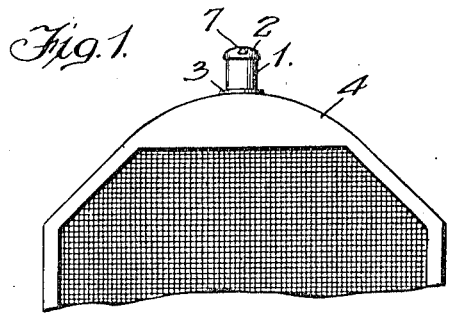
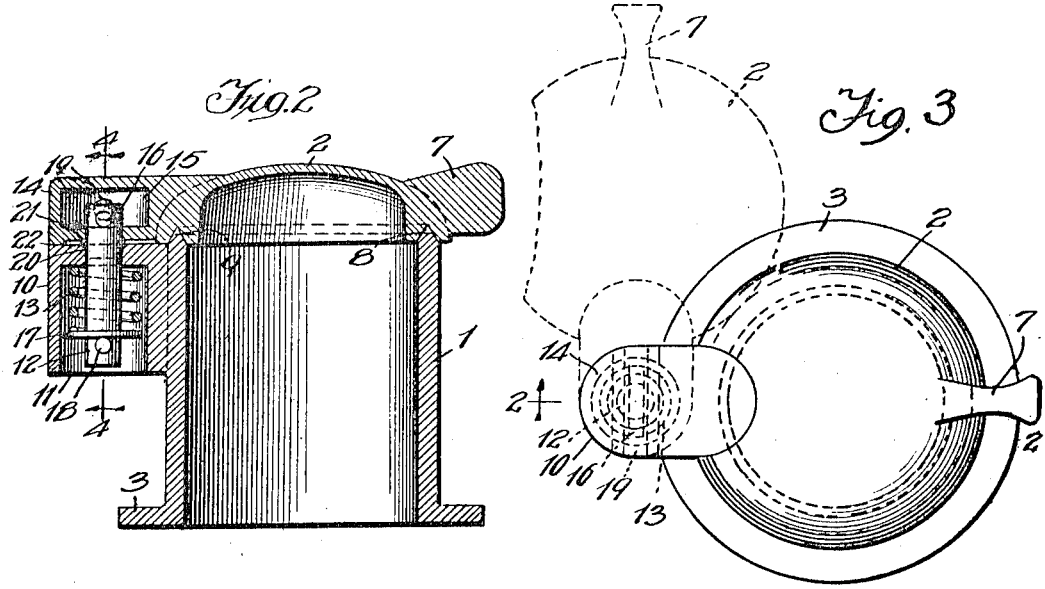
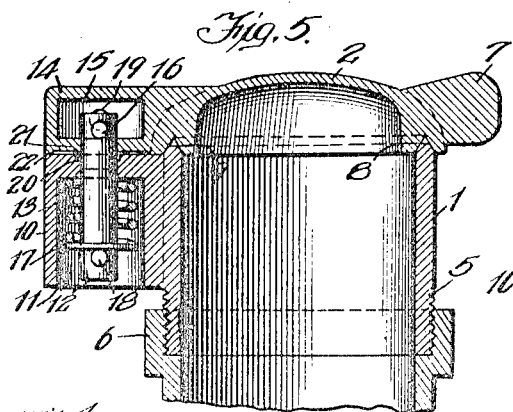
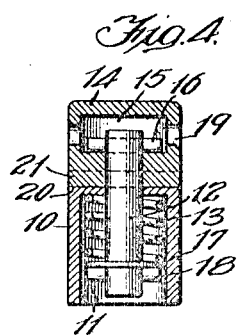
Witnesses
W. P. Kilroy
Harry R. White
Inventor:
Elisha D. Cullison
By Brown, Hanson & Boettcher
Attys.

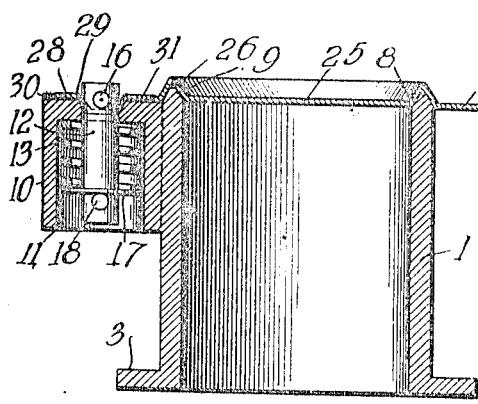
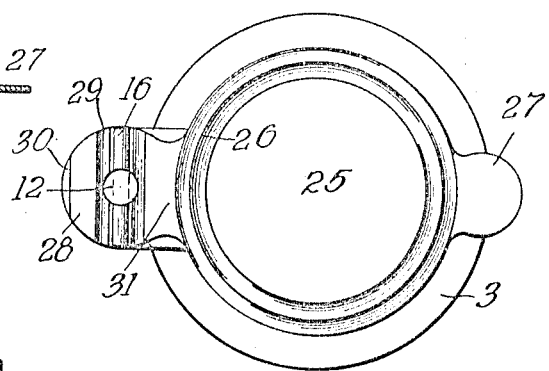
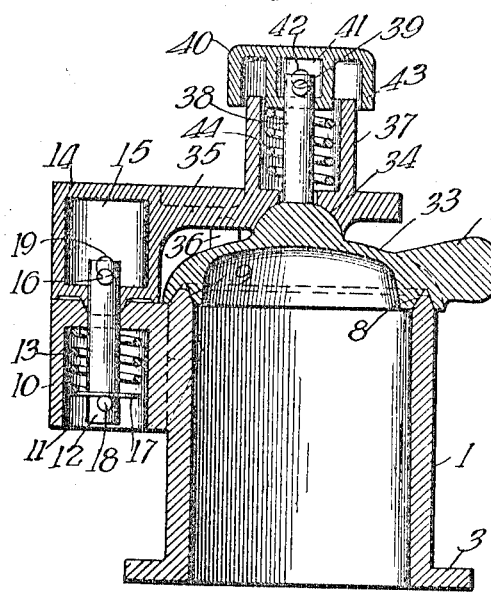
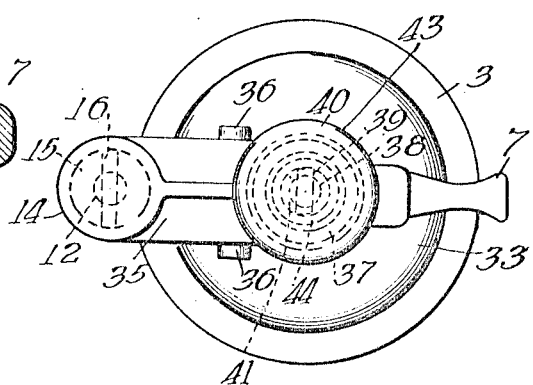

UNITED STATES PATENT OFFICE.

ELASHA D. CULLISON, OF CHICAGO, ILLINOIS.

FILLER-COVER.

1,314,306.  Specification of Letters Patent.  Patented Aug. 26, 1919.

Application filed February 23, 1918. Serial No. 218,854.

*To all whom it may concern:*

Be it known that I, ELASHA D. CULLISON, a citizen of the United States, residing at Chicago, in the county of Cook and State of Illinois, have invented a certain new and useful Improvement in Filler-Covers, of which the following is a full, clear, concise, and exact description, reference being had to the accompanying drawings, forming a part of this specification.

My invention relates to covers for filler openings.

While I shall describe as a specific embodiment of my invention a filler cover for automobile radiators, I do not intend to limit the invention to such use, as it will be apparent to those skilled in the art that my invention may be applied to cans, tanks and any kind of container generally.

The chief object of the present invention is to provide a filler cover of simple, durable construction which is readily operable to open or close substantially instantly and which will maintain a tight closure up to a predetermined internal pressure and then act as a release valve. Other incidental objects relating more particularly to the mechanical assembling of the structure will be apparent from the following specification.

The usual screw cap employed for automobile radiators has proven to be highly unsatisfactory. If the threads become crossed the cap is useless. The cap is usually too hot to be handled with any degree of comfort and it is usually so tightly held that considerable exertion is necessary to loosen it. If it is left loose it is very likely to be lost. Considerable time is required to unscrew and to fasten the cap and such a cap, in addition to being liable to become lost is also liable to be damaged, particularly because of the exposed threads.

My invention avoids these difficulties. I employ a ground seat and cover for making a tight joint. The cover and seat member are permanently hinged together and a spring holds the parts in proper relation. The seat member and cover member have coöperating conical faces of a given degree of taper. A cam having a lift more rapid than the taper of the joint from its cover member is adapted to raise the cover off the seat upon rotation of the cover with respect to the seat. The cam at the same time serves as a fulcrum for the spring, for nominally holding the cover tight upon the seat. If the internal pressure rises to a point exceeding the predetermined strength of the spring, the cover will be lifted from its seat, operating as a safety valve to relieve the internal pressure.

In order to apprise those skilled in the art how to employ and practice my invention I shall now describe a particular embodiment in which my invention may appear.

In the accompanying drawings which form a part of the present specification—

Figure 1 is a front elevational view of a filler cover constructed in accordance with my invention, mounted for use on an automobile radiator;

Fig. 2 is a longitudinal section taken on the line 2—2 of Fig. 3;

Fig. 3 is a top plan view;

Fig. 4 is a fragmentary sectional view taken on the line 4—4 of Fig. 2;

Fig. 5 is a view similar to Fig. 2 of a modification;

Fig. 6 is a fragmentary isometric view of the lug provided on the collar member;

Fig. 7 is a vertical longitudinal section of a modification;

Fig. 8 is a plan view of the same;

Fig. 9 is a longitudinal section of a further modification; and

Fig. 10 is a plan view of the same.

The device of my invention comprises a collar member 1 and a cap member 2. These parts are secured together at all times, so that the cover cannot be lost, but, as will be described in detail later, in such particular relation that the cover normally forms a tight closure for the collar 1. The collar 1 may be provided with a flange 3, as shown in Figs. 1 and 2 for attachment directly to the top of the radiator 4, as shown in Fig. 1.

The flange 3 may be dispensed with and the outside of the collar threaded as shown at 5 in Fig. 5, particularly where it is desired to substitute the present device in place of the filler cap now in use for automobile radiators and the like. In such case the threads 5 of the collar 1 are secured in a threaded seat 6 in place of the usual cap or cover.

The collar 1 is provided with a double conical seat, preferably ground or machined, to present an outer conical seating surface and an inner conical seating surface. The top of the double seat is rounded off slightly, as can be seen in Figs. 2 and 5.

The cover member 2 has an annular V-shaped groove in the lower face thereof as shown at 9, the sides of the V-shaped groove being adapted to coöperate with the sides of the double conical seat 8. I do not intend to be limited to the use of a double conical seat and groove, as it is apparent that a single conical surface will suffice to form a tight joint.

The cover member 2 is provided with a projecting finger piece 7 by which the cover member may be manipulated.

The collar 1 is provided at its rear side with the lug 10, which has a hollow cylindrical bore extending upward from the lower surface, to form a suitable housing for the pivot pin or shaft 12 and the spring 13.

The cover member 2 has a similar lug 14 extending from the rear thereof, this lug being hollowed out as shown at 15 to provide a suitable recess for the upper end of the pivot 12 and the key 16. The piovt pin 12 is provided at its lower end with a key, in the form of a round transverse pin 18, which is of a length substantially equal to the diameter of the cavity or bore 11. A washer 17, rests upon the key 16 and between this washer 17 and the bottom of the bore 11 is placed the compression spring 13. The pin 12 is loose in the lug 14 and in the lug 10. The upper key or pin 16 is introduced into the recess or cavity 15 through the opening 19, which is slightly above the floor of the recess. To introduce the key 16 the shaft 12 is pressed upward against the spring until the opening for the key 16 lies in register with the opening 19. The pin 16 may then be introduced and the spring 13 will thereafter hold the key 16 against the bottom of the recess 15, securely holding said pin in place. In this manner both the key pins 16 and 18 are held in the pivot pin 12 against possibility of loss.

The lug 10 is provided at its upper surface with symmetrical cam notches 20—20, lying on opposite sides of the center of the lug, substantially at right angles to the front and rear line of the device. The bottom of the lug 14 on the cap member 2 is provided with cam projections 21—21 lying on opposite sides of the pivot pin or shaft 12. These cam projections are adapted to register with the cam notches 20—20 in the lug 10.

The operation of the device is as follows: The parts are assembled by placing the key 18, washer 17 and spring 13 on the lower end of the shaft 12 and then pressing said shaft up into the recess 15 in the lug 14 until the opening for the key pin 16 comes in register with the opening 19 provided in the side wall of the recess 15.

The key 16 is then inserted and the pressure upon the bottom of the shaft 12 released. The spring thereafter holds the key pin 16 down below the opening 19 securely locking the parts together. To open the cover the finger piece 7 is struck with the thumb or finger of the operator and the cover 2 will be first lifted and then rotated off of the seat 8.

There is a particular relation between the taper of the seat 8 and the taper of the cam projections 21 and their corresponding notches 20. It is to be observed that the taper of the cam projections 21 and notches 20 is sharper than the taper of the seat member 8, so that as soon as pressure is applied the cam lifts the cover 2 off of the seat 8.

The flat bottom portion of the lug 14 and the flat top portion of the lug 10, preferably seat at substantially the same time that the cam projections 21 seat in the cam notches 20 and the cover 2 seats upon the conical seat 8. If any release between the surfaces is desired, this may be secured as indicated in Fig. 2, leaving preferably a contact as at the point 22, to provide a pivot by which the spring 13 operates through a short lever arm to hold the long lever arm comprising the cover 2 upon the seat 8.

It is not essential that the cams 21 and notches 20 be transferred to the fore and aft line of the device, and I may place these cams in any position desired, the position shown being preferable for the purpose of balancing the pressure upon the seat.

In the modification shown in Figs. 7 and 8, a sheet metal top 25 is shown, this top having a V-shaped groove 26 stamped or pressed therein to form a coöperating seating surface with the tapered seat on the thimble or collar 1. The top 25 is provided with a suitable finger piece 27 for operating the same. Instead of providing a separate hollow boss, as previously described, an integral ear 28 pivoted on the pin or shaft 12 forms a mounting for the cap 25. A depressed cam portion is formed by pressing a groove 29 across the ear 28. This cam portion coöperates with the transverse groove or cam notch 20 in the hub member 10 to secure the same camming action for lifting the cap, as was described in connection with Figs. 1 to 6 inclusive. The rear edge of the ear 28 is bent down sufficiently to secure a bearing, as indicated at 30, to insure a tight closure of the cap upon the seat.

An important construction in the present structure is the formation of a flexible hinge-like connection between the cap proper and the ear 28 and I have illustrated this idea in the narrow portion 31, which connects the cap proper and the ear 28 and which permits the cap proper to seat on the conical seat independent of the ear 28. The portion 31 thus serves as a yielding spring hinge connection between the ear and the cap.

In Fig. 9 I have illustrated a modification in which the cap 33 is mounted by means of the ball and socket joint 34 upon an arm 35 which is formed integrally with the lug 14.

The cap member 33 has a pair of fingers 36 upon opposite sides of the arm 35 to prevent rotation of the cap 33 with respect to the arm 35. A cylindrical housing 37 is formed on the upper side of the arm 35 above the ball and socket joint 34. A stud 38 secured to the center of the cap 33 passes through an opening in the arm 35 through the housing 37 and is secured at its upper end by a transverse pin 39 to the cap 40. The cap 40 has a central hollow lug 41 for receiving the upper end of the stud 38, the pin 39 being inserted through a transverse opening 42 slightly above the floor of the hollow boss 41. The cap 40 is provided with a depending flange 43 which covers the open end of the housing 37. A spring 44 is confined in the housing 37 between the cap 40 and the lever 35. This spring tends to hold the ball and socket yieldingly in place, permitting sufficient play of the cap 35 to find a tight seat upon the collar 1.

The fingers 36 may have a small amount of play with the flange on the arm 35, the preliminary motion of rotation serving to grind the cap more firmly upon the seat.

I consider that I am the first to employ a cam of sharper lift than the taper of the seat for raising the cover off the seat. I do not intend to be limited to the precise details shown and described, as my invention is not limited thereto and may appear in various forms.

I claim:

1. In combination, an annular collar member having a conical seat on its outer end, a recessed lug formed integral with the collar, a cover member having a conical surface adapted to co-act with the conical seat, a shaft mounted in the lug and means locking it secured to the cover, said shaft lying parallel to the axis of the cover and a spring in said lug for holding the cover upon the seat.

2. In combination, a collar having a conical seat, a cover member having a conical surface coöperating with the seat to form a closure, a vertical pivot for said cover, cam means having a sharper lift than the taper of the conical seat surrounding said pivot, arranged to automatically lift the cover as it is rotated upon its seat to swing freely over the seat.

3. In combination, a collar having a conical seat, a cover member having a co-operating conical surface to provide a closure with the seat, lugs on said collar and on said cover, a shaft passing through said lugs, coöperating cam surfaces on said lugs for automatically lifting the cover to free it from the seat as the cover begins to swing on its opening movement, and means in the lug on said collar to hold the cover upon its seat.

4. In combination, a collar having a conical seat, a cover having a conical surface coöperating therewith to form a closure, coöperating lugs on the collar and on the cover, the lug on the collar having a recess in the lower end thereof for receiving a spring, a shaft lying parallel to the axis of the collar projecting upward through the lug on the collar and being secured to the lug on the cover member, and cam surfaces on the adjacent faces of the lugs on said collar for lifting the cover free of the seat as the cover is swung around.

5. In combination, a collar having a seating surface, a cover member having a co-acting seating surface for closing the outer end of the collar, a shaft substantially parallel with the axis of the collar, said cover member being pivoted on said shaft, the said cover member having cam means concentric with said shaft for raising the cover from the seating surface on said collar when the cover member is rotated with respect to the shaft, said cam means comprising a cam integral with said cover adapted to engage a recess in said collar.

6. In combination, a collar having a seating surface, a coöperating cap member having a surface adapted to engage said seating surface to form a closure for the collar, said cover having a hollow lug, said collar having a lug registering with said hollow lug, a shaft passing through said second lug and having its end extending into the recess in said hollow lug, said hollow lug having an opening extending diametrically through the side walls of the same at a short distance above the floor of the recess and a pin passing through said shaft.

7. In combination, a collar having a seating surface, a coöperating cap member having a surface adapted to engage said seating surface to form a closure for the collar, said cover having a hollow lug, said collar having a lug registering with said hollow lug, a shaft passing through said second lug and having its end extending into the recess in said hollow lug, said hollow lug having an opening extending diametrically through the side walls of the same at a short distance above the floor of the recess and a pin passing through said shaft, and cam means on said lug camming said lugs on said collars for raising the cover from the collar.

8. In combination, a collar having a conical seat, a cover member having a conical surface co-acting with the seat to form a closure, a pivot for the cover placed eccentrically of the collar, and coöperating cams on the collar and cover effecting the lifting of the cover to freely pass the seat as the cover begins its opening rotation on said pivot.

9. In combination, a collar having a conical seat, a cover member having a conical surface coöperating with the seat to form a closure, a pivot for the cover placed eccentrically of the collar, and coöperating cams on the cover and collar for automatically lifting the cover from the collar to swing freely over the seat as the cover begins its opening movement on said pivot, and a spring connection between the collar and the cover for holding the cover in tight relation with the seat.

10. In combination, a collar having a conical seat, a cover having a conical surface coöperating therewith to close the collar, coöperating lugs carried by the cover and collar, a pivot shaft in said lugs parallel with the axis of the collar, coöperating cam surfaces on the lugs adapted to lift the cover to free it from the seat as the cover begins its opening movement, and a yielding spring connection between the cover and its lug, permitting the tight closing of the cover upon the seat.

11. In combination, a collar having a conical seat, a cover having a conical surface coöperating therewith to close the collar, coöperating lugs carried by the cover and collar, a pivot shaft in said lugs parallel with the axis of the collar, coöperating cam surfaces on the lugs adapted to lift the cover to free it from the seat as the cover begins its opening movement, an arm extending from said cover lug over the middle portion of the cover, and a spring held joint between the cover and said arm permitting the cover to find a tight seat upon the collar.

12. In a device of the kind described, a filling collar, a conical seat on the outer end of the collar, a cover member having a coöperating conical surface to close the collar, a pivot carried by the collar on its outer wall and parallel with the axis thereof, a cover lug mounted on the pivot, coöperating cam surfaces on the collar and lug surrounding the pivot and adapted to lift the lug as the cover begins its opening movement, the cover lug having an arm extending over the middle portion of the cover, a centrally arranged ball and socket joint between said arm and the cover, and a spring holding the cover yieldingly in contact with the arm at the said joint, thereby permitting the cover to find a tight seat upon the collar.

13. In a device of the kind described, a filling collar, a conical seat on the outer end of the collar, a cover member having a coöperating conical surface to close the collar, a pivot carried by the collar on its outer wall and parallel with the axis thereof, a cover lug mounted on the pivot, coöperating cam surfaces on the collar and lug surrounding the pivot and adapted to lift the lug as the cover begins its opening movement, the cover lug having an arm extending over the middle portion of the cover, a centrally arranged ball and socket joint between said arm and the cover, a spring carried by the arm and holding the cover yieldingly in contact with the arm at the said joint, thereby permitting the cover to find a tight seat upon the collar, an opening lug on the cover opposite to the pivot, and means preventing rotation of the cover on the arm.

In witness whereof I hereunto subscribe my name this 21st day of February A. D. 1918.

ELASHA D. CULLISON.